United States Patent
Jain et al.

(10) Patent No.: US 10,126,971 B1
(45) Date of Patent: Nov. 13, 2018

(54) ENHANCED APPLICATION PERFORMANCE IN MULTI-TIER STORAGE ENVIRONMENTS

(71) Applicant: International Business Machines Corporation, Armonk, NY (US)

(72) Inventors: Abhishek Jain, Baraut (IN); Kushal S. Patel, Pune (IN); Sarvesh S. Patel, Yeola (IN); Subhojit Roy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/629,670

(22) Filed: Jun. 21, 2017

(51) Int. Cl.
  *G06F 12/00* (2006.01)
  *G06F 3/06* (2006.01)

(52) U.S. Cl.
  CPC ............ *G06F 3/064* (2013.01); *G06F 3/0619* (2013.01); *G06F 3/0647* (2013.01); *G06F 3/0652* (2013.01); *G06F 3/0653* (2013.01); *G06F 3/0685* (2013.01)

(58) Field of Classification Search
  None
  See application file for complete search history.

(56) References Cited

U.S. PATENT DOCUMENTS

| | | | |
|---|---|---|---|
| 7,434,002 B1 * | 10/2008 | Zedlewski | G06F 11/3409 711/130 |
| 9,158,706 B2 | 10/2015 | Benhase et al. | |
| 9,171,020 B2 | 10/2015 | Faerber et al. | |
| 9,251,195 B2 * | 2/2016 | Yamada | G06F 15/16 |
| 9,529,808 B1 * | 12/2016 | Sudarsanam | G06F 17/30088 |
| 2004/0073582 A1 * | 4/2004 | Spiegel | G06F 3/0619 |
| 2010/0088468 A1 | 4/2010 | Agombar et al. | |
| 2010/0281230 A1 | 11/2010 | Rabii et al. | |
| 2012/0260038 A1 * | 10/2012 | Imazaki | G06F 3/0608 711/114 |
| 2015/0286436 A1 * | 10/2015 | Olson | G06F 3/0619 711/162 |
| 2017/0060744 A1 * | 3/2017 | Saitou | G06F 3/0647 |
| 2018/0089033 A1 * | 3/2018 | Tamura | G06F 11/1451 |
| 2018/0137012 A1 * | 5/2018 | Bender | G06F 11/1451 |

* cited by examiner

*Primary Examiner* — John A Lane
(74) *Attorney, Agent, or Firm* — Zilka & Kotab, P.C.

(57) ABSTRACT

A computer-implemented method, according to one embodiment, includes: maintaining a heat map monitoring table on a per volume basis for a plurality of volumes in a multi-tier data storage architecture, where the heat map monitoring table includes a heat count for each data block in the respective volume. The computer-implemented method further includes: receiving a request to delete a first volume of the plurality of volumes, identifying which data blocks in the first volume are depended on by one or more other volumes of the plurality of volumes, copying the identified data blocks and the corresponding heat counts to the respective one or more other volumes, and sending a list which includes the identified data blocks and the corresponding heat counts to a controller. Other systems, methods, and computer program products are described in additional embodiments.

20 Claims, 13 Drawing Sheets

ENHANCED APPLICATION PERFORMANCE IN MULTI-TIER STORAGE ENVIRONMENTS

BACKGROUND

The present invention relates to data storage systems, and more particularly, this invention relates to improving performance in multi-tier data storage environments.

Multi-tier data storage environments may include different types of memory at the different storage tiers. Moreover, the type of memory at each of the tiers may be selected to meet a certain set of performance standards and/or a storage architecture. A storage system (e.g., file system) defines the manner of naming files and placing them on storage devices for storage and retrieval. Storage system functionality can be divided into two components which include a management component and a storage component. The management component corresponds to the management of files within directories, file path traversals and user access to the file, while the storage component of the file system determines how file is stored physically on the storage devices (e.g., memory) in the storage system.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is typically 256 pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The LSA architecture relies on out-of-place writes. In this approach, a memory page overwrite will result in writing the memory page data to a new location in memory, marking the old copy of the memory page data as invalid, and then updating the mapping information. Due to the limitations of current NAND memory technology, an invalidated data location cannot be reused until the entire block it belongs to has been erased. Before erasing, though, the block undergoes garbage collection, whereby any valid data in the block is relocated to a new block. Garbage collection of a block is typically deferred for as long as possible to maximize the amount of invalidated data in block, and thus reduce the number of valid pages that are relocated, as relocating data causes additional write operations, and thereby increases write amplification.

SUMMARY

A computer-implemented method, according to one embodiment, includes: maintaining a heat map monitoring table on a per volume basis for a plurality of volumes in a multi-tier data storage architecture, where the heat map monitoring table includes a heat count for each data block in the respective volume. The computer-implemented method further includes: receiving a request to delete a first volume of the plurality of volumes, identifying which data blocks in the first volume are depended on by one or more other volumes of the plurality of volumes, copying the identified data blocks and the corresponding heat counts to the respective one or more other volumes, and sending a list which includes the identified data blocks and the corresponding heat counts to a controller.

A computer-implemented method, according to another embodiment, includes: receiving a list of data blocks included in a volume and identified as being depended on by one or more other volumes of a plurality of volumes in a multi-tier data storage architecture, and using heat counts corresponding to the identified data blocks to determine a tier in the multi-tier data storage architecture on which to store each of the identified data blocks. The received list includes a heat count corresponding to each of the identified data blocks in the list. Moreover, the heat counts correspond to a heat map monitoring table maintained on a per volume basis for a plurality of volumes in the multi-tier data storage architecture.

A computer program product, according to yet another embodiment, includes a computer readable storage medium having program instructions embodied therewith. The computer readable storage medium is not a transitory signal per se. Moreover, the program instructions are readable and/or executable by a processor to cause the processor to perform a method which includes: receiving, by the processor, a list of data blocks included in a volume and identified as being depended on by one or more other volumes of a plurality of volumes in a multi-tier data storage architecture; and using, by the processor, heat counts corresponding to the identified data blocks to determine a tier in the multi-tier data storage architecture on which to store each of the identified data blocks. The received list includes a heat count corresponding to each of the identified data blocks in the list. Moreover, the heat counts correspond to a heat map monitoring table maintained on a per volume basis for a plurality of volumes in the multi-tier data storage architecture.

Other aspects and embodiments of the present invention will become apparent from the following detailed description, which, when taken in conjunction with the drawings, illustrate by way of example the principles of the invention.

DETAILED DESCRIPTION

Figure 1:
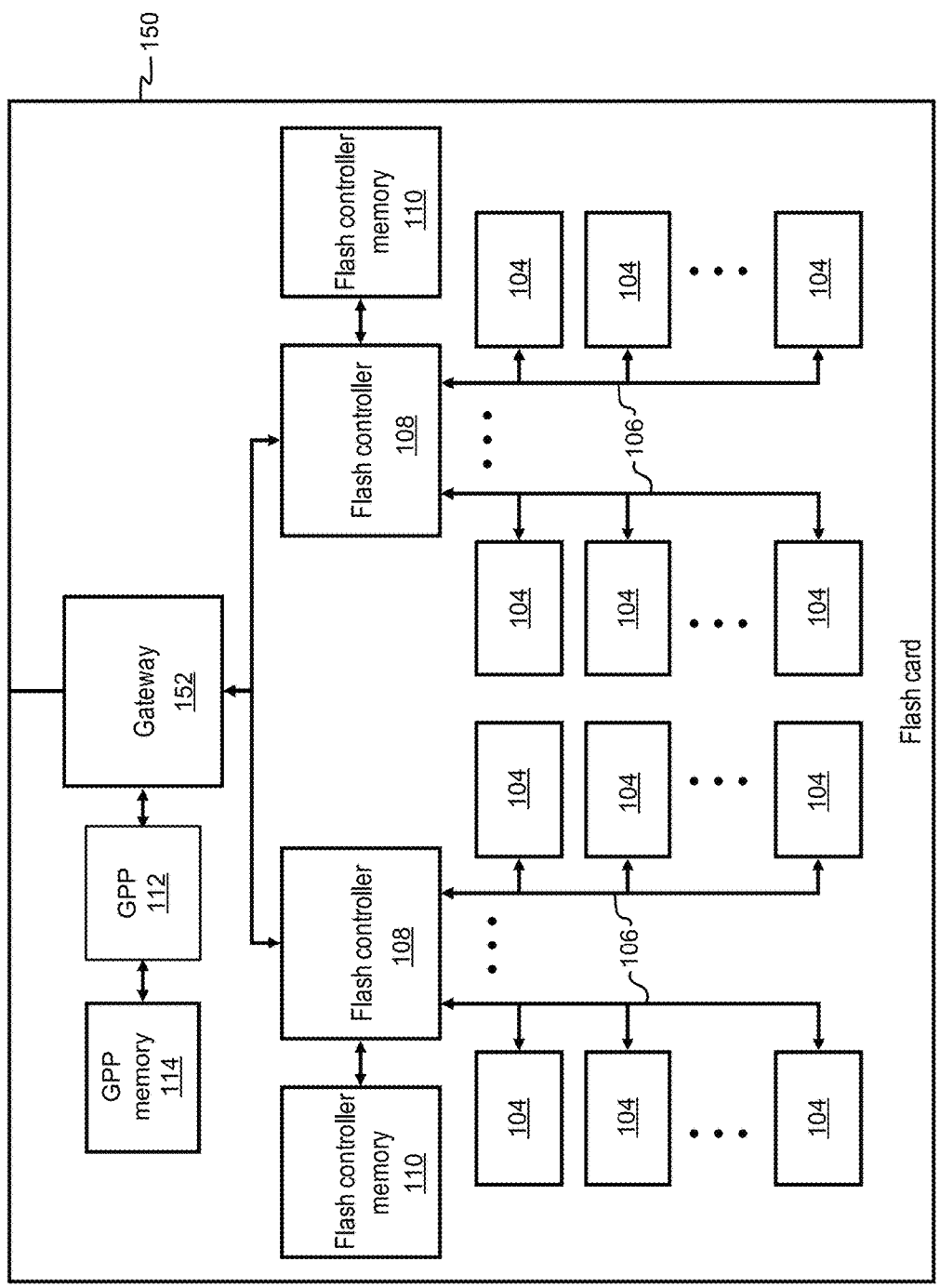
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof are able to provide efficient data management of different performance tiers in multi-tiered storage architectures. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method includes: maintaining a heat map monitoring table on a per volume basis for a plurality of volumes in a multi-tier data storage architecture, where the heat map monitoring table includes a heat count for each data block in the respective volume. The computer-implemented method further includes: receiving a request to delete a first volume of the plurality of volumes, identifying which data blocks in the first volume are depended on by one or more other volumes of the plurality of volumes, copying the identified data blocks and the corresponding heat counts to the respective one or more other volumes, and sending a list which includes the identified data blocks and the corresponding heat counts to a controller.

In another general embodiment, a computer-implemented method includes: receiving a list of data blocks included in a volume and identified as being depended on by one or more other volumes of a plurality of volumes in a multi-tier data storage architecture, and using heat counts corresponding to the identified data blocks to determine a tier in the multi-tier data storage architecture on which to store each of the identified data blocks. The received list includes a heat count corresponding to each of the identified data blocks in the list. Moreover, the heat counts correspond to a heat map monitoring table maintained on a per volume basis for a plurality of volumes in the multi-tier data storage architecture.

In yet another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: receiving, by the processor, a list of data blocks included in a volume and identified as being depended on by one or more other volumes of a plurality of volumes in a multi-tier data storage architecture; and using, by the processor, heat counts corresponding to the identified data blocks to determine a tier in the multi-tier data storage architecture on which to store each of the identified data blocks. The received list includes a heat count corresponding to each of the identified data blocks in the list. Moreover, the heat counts correspond to a heat map monitoring table maintained on a per volume basis for a plurality of volumes in the multi-tier data storage architecture.

FIG. 1 illustrates a memory card 150, in accordance with one embodiment. It should be noted that although memory card 150 is depicted as an exemplary non-volatile data storage card in the present embodiment, various other types of non-volatile data storage cards may be used in a data storage system according to alternate embodiments. It follows that the architecture and/or components of memory card 150 are in no way intended to limit the invention, but rather have been presented as a non-limiting example.

Moreover, as an option, the present memory card 150 may be implemented in conjunction with features from any other embodiment listed herein, such as those described with reference to the other FIGS. However, such memory card 150 and others presented herein may be used in various applications and/or in permutations which may or may not be specifically described in the illustrative embodiments listed herein. Further, the memory card 150 presented herein may be used in any desired environment.

With continued reference to FIG. 1, memory card 150 includes a gateway 152, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 150. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
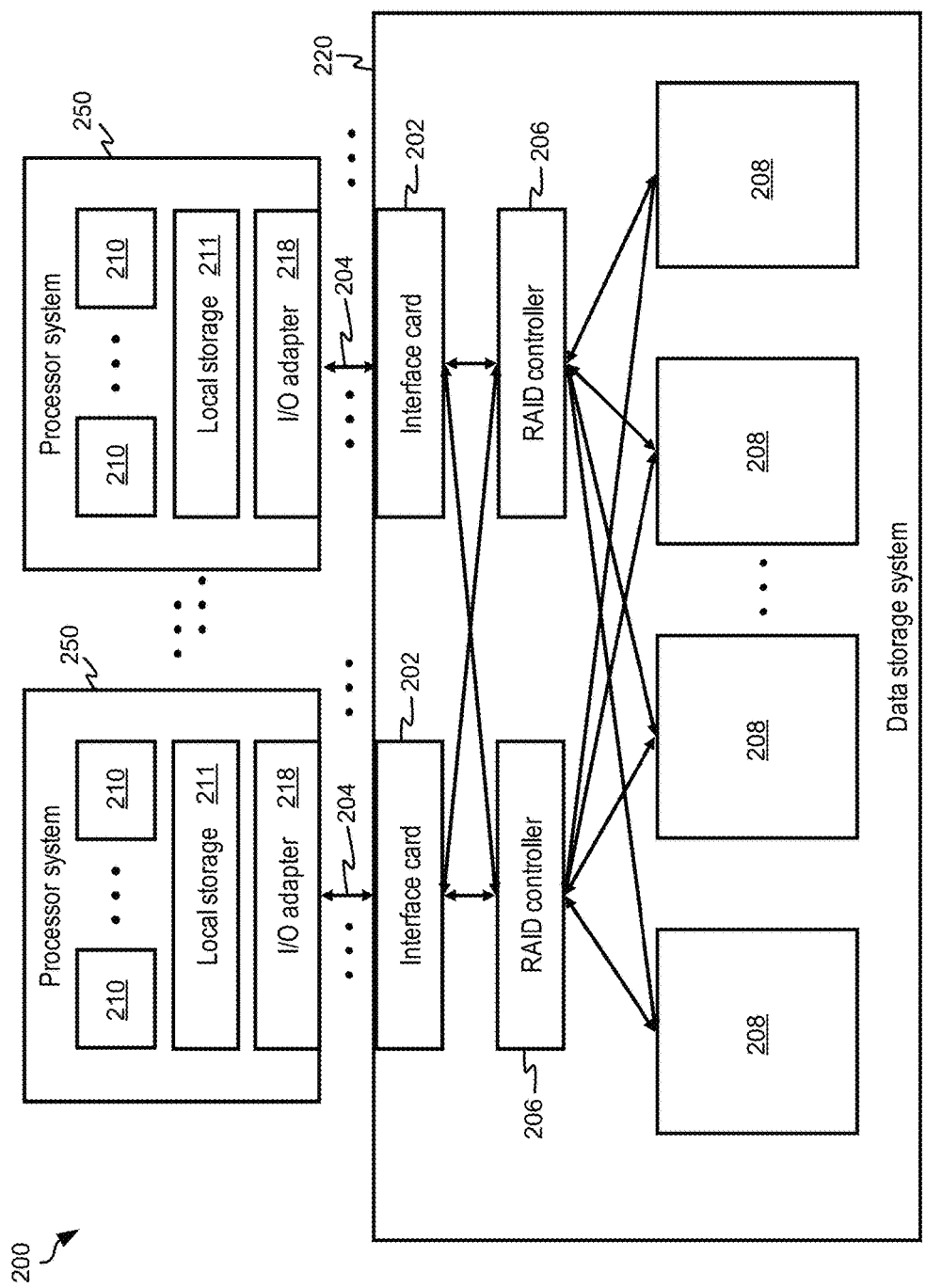
FIG. 2 is a diagram of a data storage system architecture, in accordance with one embodiment.

As previously mentioned, memory card 150 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 250. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 250 comprises one or more processors 210 (such as CPUs, microprocessors, etc.), local data storage 211 (e.g., such as RAM 1314 of FIG. 13, ROM 1316 of FIG. 13, etc.), and an I/O adapter 218 configured to communicate with the data storage system 220.

Referring again to FIG. 1, memory controllers 108 and/or other controllers described herein (e.g., RAID controllers 206 of FIG. 2) may be able to perform various functions on stored data, depending on the desired embodiment. Specifically, memory controllers may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, LEBs may be identified for being reclaimed and/or relocated. Typically, one LEB corresponds to one block stripe, but alternative implementations may consider a fixed number of block stripes building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 of FIG. 1) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat segregation.

Heat Segregation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for heat segregation when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, heat segregation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of heat segregation is two-fold. First, performing a garbage collection process on a hot memory block will prevent triggering the relocation of cold data as well. In the absence of heat segregation, updates to hot data, which are performed frequently, also results in the undesirable relocations of all cold data collocated on the same LEB as the hot data being relocated. Therefore the write amplification incurred by performing garbage collection is much lower for embodiments implementing heat segregation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat segregation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Figure 3:
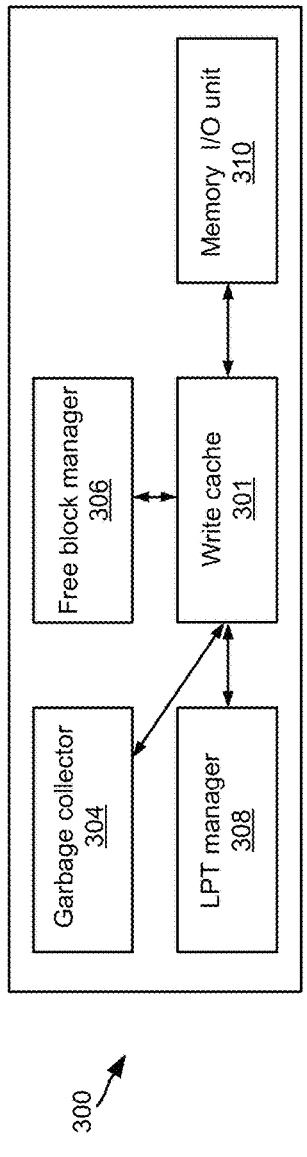
FIG. 3 is a system diagram, in accordance with one embodiment.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 301 which is coupled to several other components, including garbage collector 304. As previously mentioned, garbage collector 304 may be used to free LEB units by relocating valid data and providing non-volatile memory blocks to be erased for later reuse. Thus the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 301 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 301 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4 KiB logical addresses. The memory I/O unit 310 communicates with the memory chips in order to perform low level operations, e.g., such as reading one or more non-volatile memory pages, writing a non-volatile memory page, erasing a non-volatile memory block, etc.

Figure 4:
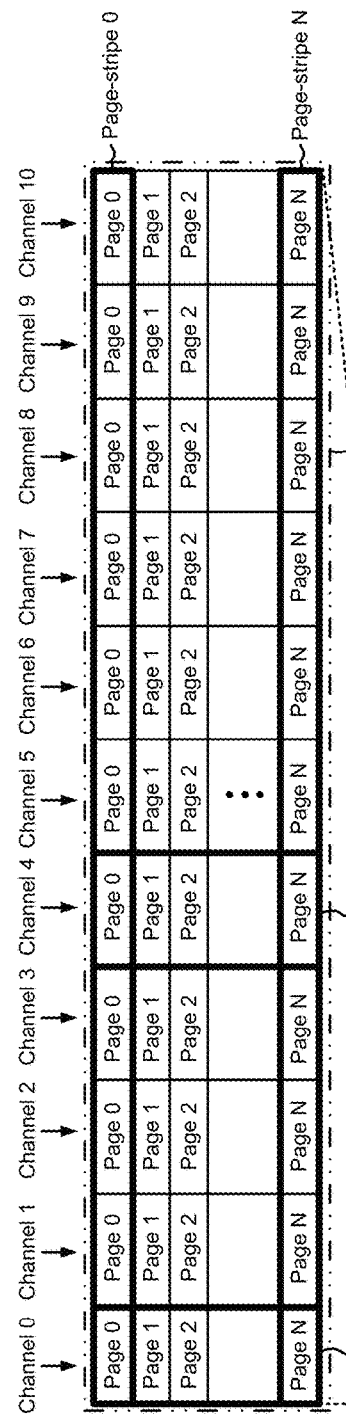
FIG. 4 is a conceptual diagram which includes a block-stripe and page-stripe, in accordance with one embodiment.

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripe. Thus, according to an illustrative embodiment, Block 0 through Block 10 from different physical planes may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or less in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As previously mentioned, multi-tier data storage environments may include different types of memory at the different storage tiers. Moreover, the type of memory at each of the tiers may be selected to meet a certain set of performance standards and/or a storage architecture. A storage system (e.g., file system) defines the manner of naming files and placing them on storage devices for storage and retrieval. Storage system functionality can be divided into two components which include a management component and a storage component. The management component corresponds to the management of files within directories, file path traversals and user access to the file, while the storage component of the file system determines how file is stored physically on the storage devices (e.g., memory) in the storage system.

Figure 5:
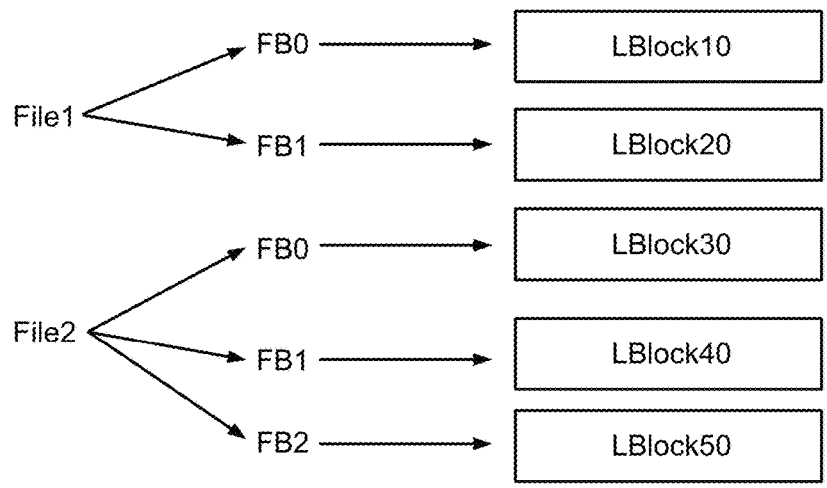
FIG. 5 is a representational view of a file system logical block mapping progression, in accordance with one embodiment.

Data is typically stored in and/or accessed from memory in terms of files. Moreover, each file may be divided into multiple blocks, each block having a same size. It follows that the number of blocks a given file is divided into depends on the overall size of the file. Referring momentarily to FIG. 5, a representational view of a file system logical block mapping progression 500 is shown according to an example which is in no way intended to limit the invention. As depicted, File1 is split into two blocks FB0 and FB1, while Filet is split into three blocks FB2, FB3 and FB4 during a file management process. Each block corresponds to a logical block on a storage device (e.g., memory). Accordingly, blocks FB0 and FB1 are shown as corresponding to logical blocks LBlock10 and LBlock20 respectively, while blocks FB2, FB3 and FB4 are shown as corresponding to logical blocks LBlock30, LBlock40 and LBlock50 respectively. A plurality of logical blocks may further be combined and stored as logical volumes in memory.

"FlashCopy" is a feature supported on various storage devices that allows nearly instantaneous point-in-time copies of entire logical volumes or data sets to be created. While "Full FlashCopy" snapshots may copy all the data in the respective source blocks, an "Incremental FlashCopy" may only include the data which has been updated (e.g., incremented) since a last FlashCopy has been performed. It should be noted that these copies of logical volumes and/or data sets are also referred to herein as "snapshots". Moreover, once created, point-in-time copies of the entire volume (snapshots) may be available for read and write access. The data copy created may thereby be used with standard backup tools to create backup copies on magnetic tape, a cloud data storage system, etc., and/or other types of data storage media which may be used for backup.

When a FlashCopy operation is initiated, a point-in-time copy of a source volume is created on a target volume, such that a FlashCopy relationship is created between the source volume and the target volume. A FlashCopy relationship may be considered a "mapping" or "map" of the source volume and the target volume which allows a point-in-time copy of the source volume to be created on the associated target volume. Moreover, the FlashCopy relationship exists between this volume pair from the point that a FlashCopy operation is initiated until the storage controller copies all data from the source volume to the target volume, or until the FlashCopy relationship is deleted.

FlashCopy relationships may further extend between more than two volumes in some approaches. For instance, a cascaded FlashCopy configuration is one where the source copy of one FlashCopy relationship is the target copy of a second FlashCopy relationship. According to an example, which is in no way intended to limit the invention, a first FlashCopy map may extend between source volume A and target volume B, while a second FlashCopy map also extends between source volume B and target volume C. Accordingly, the cascaded relationship in the present example would include volume A, volume B and volume C, as well as the two FlashCopy maps. Again, as soon as each of the FlashCopy relationships are established, the respective data copy is available for both read and write access.

Figure 6:
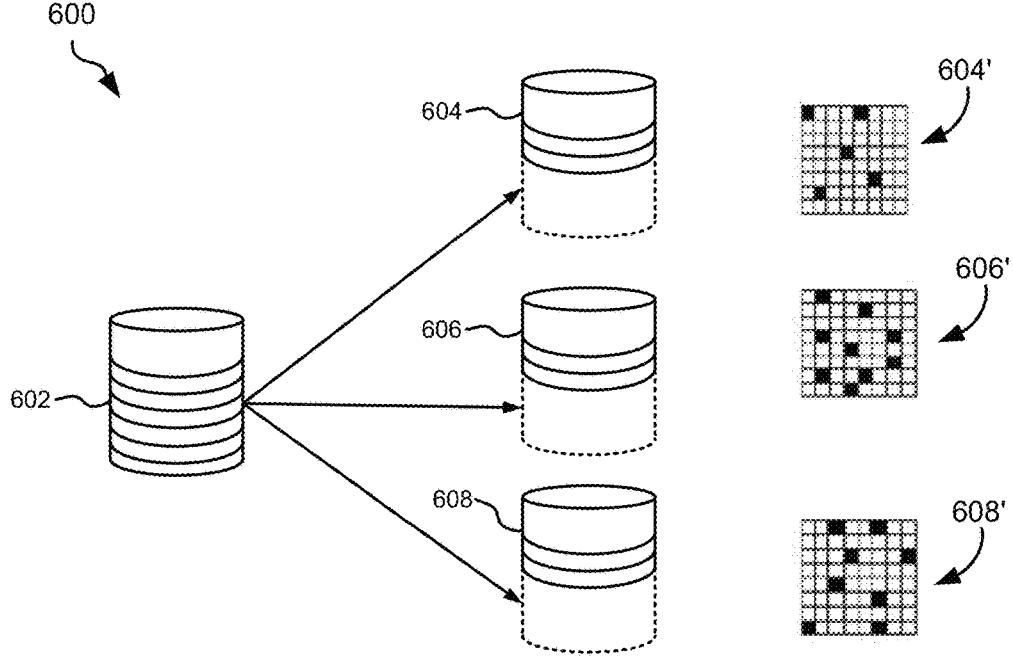
FIG. 6 is a representational view of a file system logical block mapping progression, in accordance with another embodiment.

It follows that when multiple copies of the same data are desired, multiple FlashCopy relationships may be used to cause a single source volume to be copied multiple times to different target volumes as soon as the preceding volume has been established. According to another example, which again is in no way intended to limit the invention, a FlashCopy operation may be used to copy source volume A to target volume B. Moreover, as soon as that FlashCopy relationship between source volume A and target volume B has been established, source volume A may be copied to target volume C. Again, as soon as the FlashCopy relationship between source volume A and target volume C has been established, source volume A may be copied to target volume D, and so on. Referring momentarily to FIG. 6, a representational view of a file system logical block mapping progression 600 is shown according to an example which is in no way intended to limit the invention. As depicted, a single source volume 602 is used to copy data multiple times to different target volumes 604, 606, 608. As mentioned above, once a copy of the data has been established on a given target volume, a subsequent copy may be made on another target volume. Moreover, a corresponding distribution of data across flash memory 604', 606', 608' is shown for each of the respective target volumes. Here, the changed blocks of different FlashCopy operations are shown for exemplary purposes, e.g., as would be appreciated by one skilled in the art after reading the present description.

Implementing multiple targets using a cascaded FlashCopy configuration offers desirable scalability in terms of the number of achievable data copies whilst also enabling copies of data copies to be created. However, a given copy of data included in a cascaded relationship cannot automatically be removed (e.g., deleted) due to the interconnected relationship between the cascaded copies of the data across different volumes. Thus, a cascaded FlashCopy configuration includes a process of "cleaning" a FlashCopy map before a given copy of the data can be successfully removed from a cascaded relationship without causing data corruption. The cleaning process ensures that no copy in the cascaded relationship is dependent on the target volume of the copy being removed.

The process of cleaning a FlashCopy map may be described as a process of copying grains from the map that is to be stopped when in a copying state. This may be achieved by adding a new "cleaning rate" parameter for a map which, if combined with a zero background copy rate, may cause the map to copy grains to a downstream map. A new "cleaning progress" field in the query of a map may be used to inform a user of progress. When cleaning is complete, the map may be stopped and thereby transition to stopped state, preferably immediately. If the map is stopped before the cleaning process is complete, the remainder of the cleaning may occur while in the existing stopped state.

Figure 7:
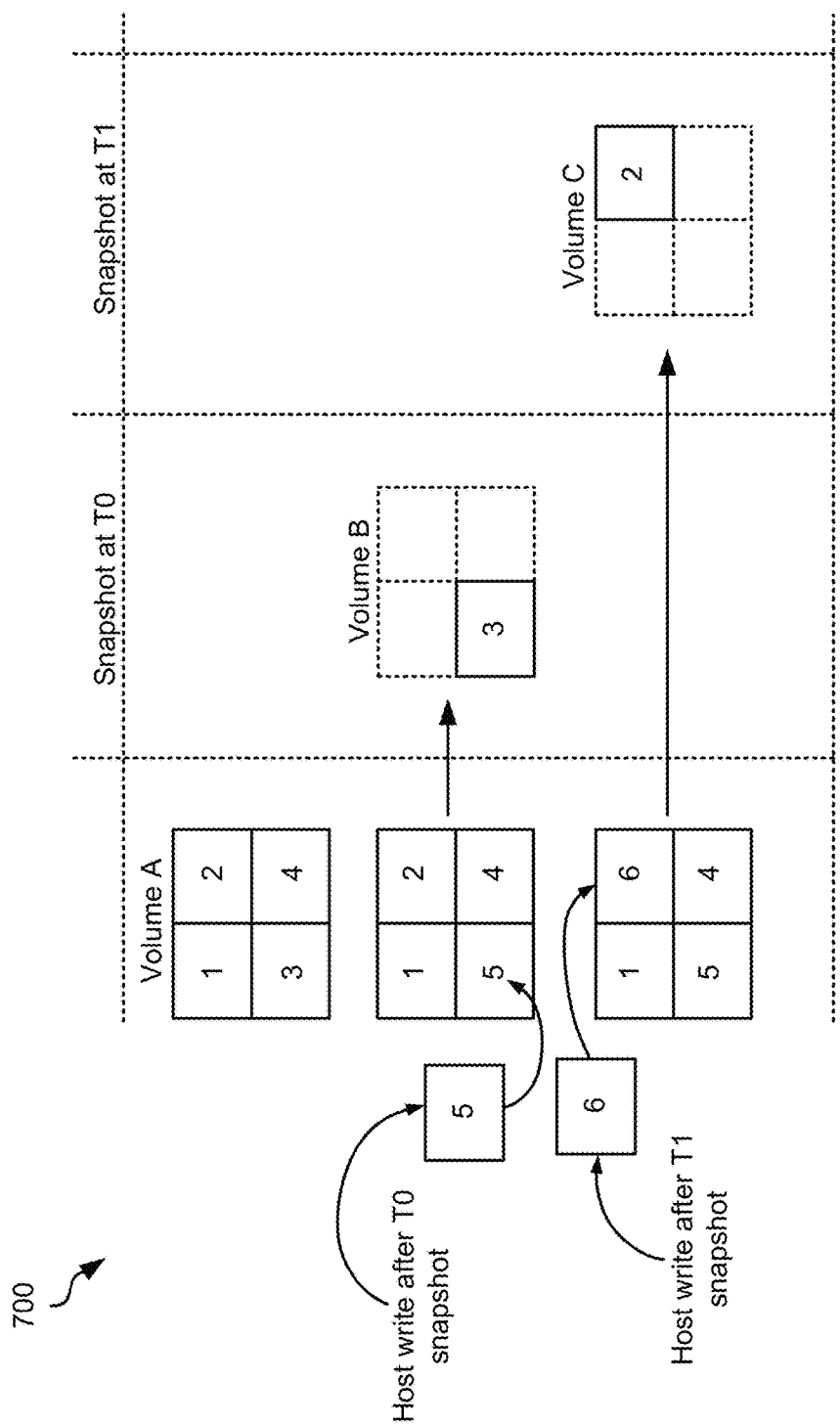
FIG. 7 is a representational view of a file system logical block mapping progression, in accordance with another embodiment

Looking now to FIG. 7, a representational view of a file system logical block mapping progression 700 is shown according to an example, which is in no way intended to limit the invention, but rather which may be used to describe the process of cleaning a FlashCopy map. As shown, snapshots of Volume A have been taken at Time 0 and Time 1, thereby creating Volume B and Volume C respectively. However, a first host write operation was performed on Volume A after the snapshot was taken at Time 0, thereby causing the data included in Volume A to vary from the data included in Volume B. Moreover, a second host write operation was performed on Volume A after the snapshot was taken at Time 1, thereby causing the data included in Volume A to vary from the data included in Volume B as well as the data included in Volume C. Accordingly, in the dependency chain, Volume B is currently dependent on Volume C with regard to the data included in the second logical block 2. Therefore, in order to delete Volume C from the dependency chain, the data included in the second storage location 2 must first be copied to a respective logical block in Volume B after which Volume C may be cleaned. It should also be noted that although only the third logical block 3 is shown in Volume B and only the second logical block 2 is shown in Volume C, a "Full FlashCopy" or "Incremental FlashCopy" may have been implemented. Accordingly the other logical blocks of Volume B and Volume C are dotted to represent that either of the volumes may include additional logical blocks from Volume A, e.g., depending on the type of FlashCopy operation which was implemented.

Performing FlashCopy operations and maintaining FlashCopy relationships becomes more complex when implemented in multi-tiered storage. Multi-tiered storage includes storage environments in which data may be stored on various different types of storage devices having different performance characteristics. The type of storage device a given portion of data is stored on may be based on one or more of criteria of access, frequency of use, security, data recovery requirements, etc. For example, data that is frequently accessed by an application and which is response time sensitive may be stored on a higher performing storage tier (e.g., SSD), while other data that is infrequently accessed and/or for which a longer response time is more acceptable may be stored on a lower performing storage tier (e.g., HDD, magnetic tape, etc.). Although higher tier storage devices may have more desirable performance characteristics, the storage cost per unit of data is higher as well when compared to lower storage tiers. Accordingly, one challenge in effectively using multi-tiered storage is efficiently identifying the smallest dataset that can benefit from the improved performance of a higher storage tier while also justifying the cost of providing such performance. Moreover, the optimal tier for a given piece of data may change over time, e.g., as the rate of access for the data changes, new storage tiers are added and/or removed from a given storage system, etc. Thus, the identification and movement of data to the appropriate tier is a continuous process.

In some embodiments, multi-tier solution technology may be implemented which is able to develop insights into the storage workloads and automate the placement of data amongst different storage tiers in order to achieve efficient storage performance. This may be achieved by implementing software, server and/or storage solutions. For example, as alluded to above, SSDs are more expensive than HDDs, therefore multi-tier solution technology may cause a dynamic and/or transparent relocation of data across storage tiers based on a temperature of the data. In other words, multi-tier solution technology may be used to implement heat segregation across the different storage tiers, e.g., based on an access rate of the data.

Figure 8:
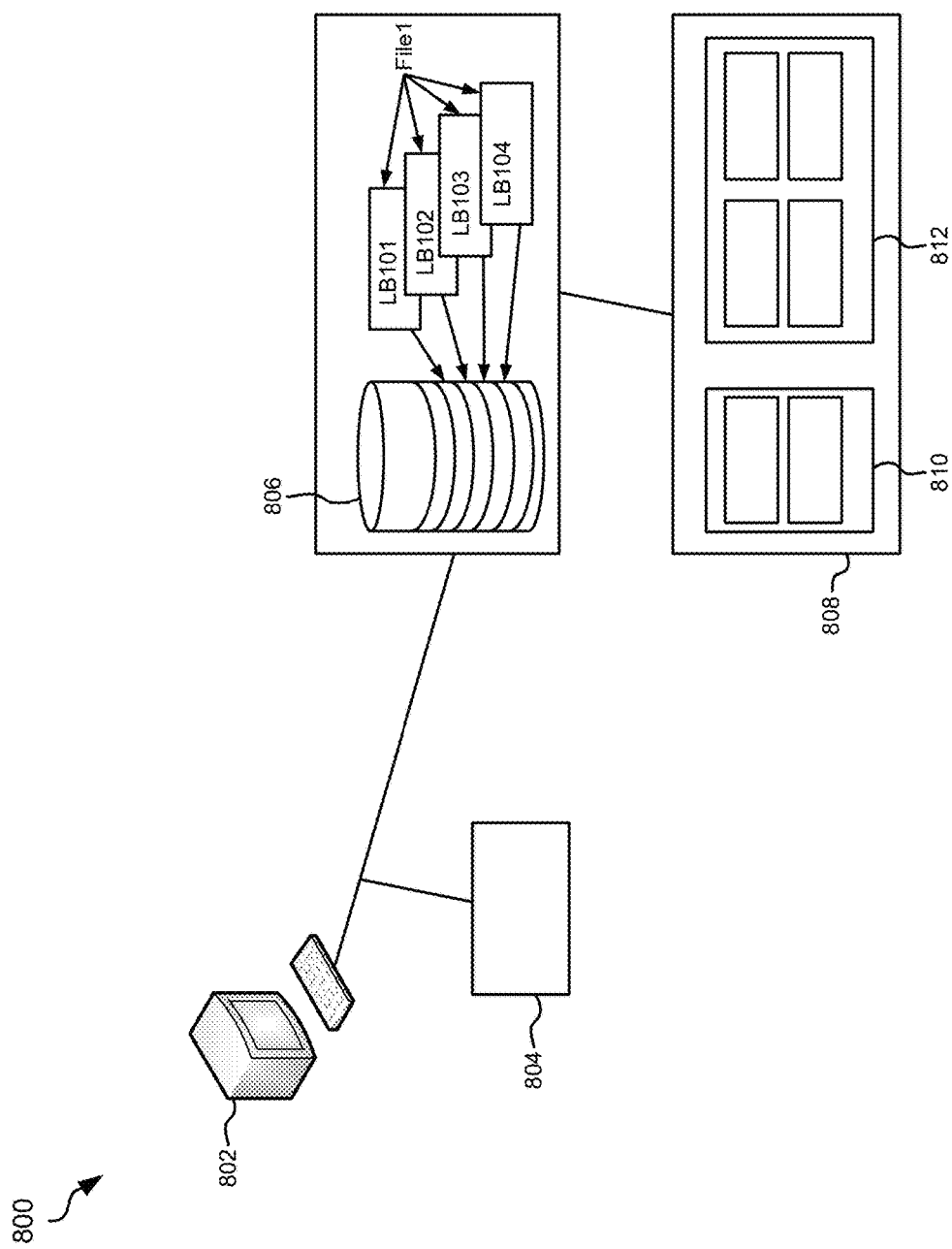
FIG. 8 is a representational view of a storage system architecture, in accordance with one embodiment.

Looking to FIG. 8, a representational view of a storage system architecture 800 is illustrated in accordance with one embodiment. As an option, the present storage system architecture 800 may be implemented in conjunction with features from any other embodiment listed herein, such as those described with reference to the other FIGS. However, such storage system architecture 800 and others presented herein may be used in various applications and/or in permutations which may or may not be specifically described in the illustrative embodiments listed herein. Further, the storage system architecture 800 presented herein may be used in any desired environment. Thus FIG. 8 (and the other FIGS.) may be deemed to include any possible permutation.

The storage system architecture 800 includes a host computing device 802 which is coupled to an I/O monitoring daemon 804. The I/O monitoring daemon 804 monitors I/Os performed on data stored in memory and may thereby determine a temperature associated with each portion of data, e.g., based on an access frequency thereof. In some approaches, the I/O monitoring daemon 804 may identify data that is heavily accessed (e.g., hot data).

A particular file File 1 may be split into more than one logical block LB101, LB102, LB103, LB104 which are in turn stored in a volume 806. Moreover, an access frequency associated with each of the logical blocks LB101, LB102, LB103, LB104 at that volume 806 may be used to determine and/or update the location in physical memory 808 which the logical blocks LB101, LB102, LB103, LB104 are mapped to. In other words, the tier in physical memory 808 on which a given amount of data is stored may be determined based on a heat of the data. Hot data is preferably stored on a higher performance tier (e.g., SSD 810), while cold data is preferably stored on a relatively lower performance tier (e.g., HDD 812, tape, etc.) in physical memory 808.

According to an in-use example, which is in no way intended to limit the invention, an Easy Tier Data Relocator may be used to determine which tier of storage certain data is desirably stored. For instance, hot data may be migrated to and/or maintained on a higher performance tier such as SSDs in view of the high throughput, low response times, higher I/O operations per second (IOPS), etc. associated with the higher performance tier. As a result, the amount of high performing (and more expensive) SSD capacity used to meet the data storage needs of a given system is more efficiently allocated, thereby desirably increasing the efficiency by which data is stored in a storage system. These improvements are experienced particularly when compared to the lack of data storage efficiency experienced conventional products, e.g., as will be described in further detail below.

Figure 9A:
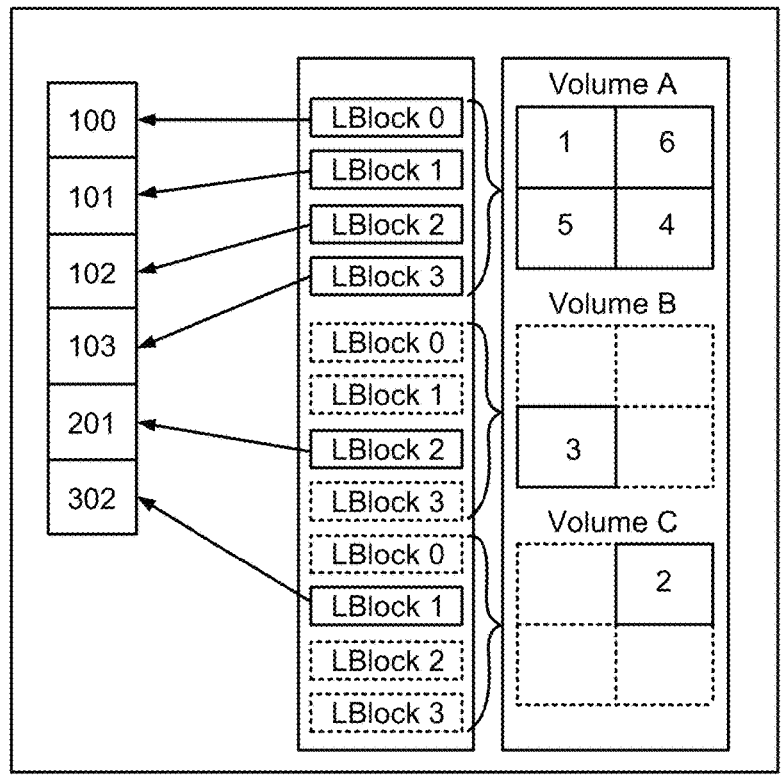
FIG. 9A is a logical block mapping progression, in accordance with one embodiment.

In conventional products, issues arise when attempting to clean a FlashCopy map which extends across different tiers of storage. As described above, a process of "cleaning" a FlashCopy map before a given volume can be successfully removed without causing data corruption typically includes migrating some of the data in the volume to a second volume which depends on the data. However, when the second volume is on a different storage tier than the volume being deleted, the data is migrated to a storage tier which does not match the temperature of the data. As a result, efficiency of data storage is reduced and system performance suffers. Referring momentarily to FIG. 9A, a logical block mapping progression 900, similar to that illustrated in FIG. 7 above, is depicted for illustrative purposes. Here, FIG. 9A depicts the logical and physical mapping of data corresponding to given volumes. Specifically, Volume A includes four different logical block addresses 0, 1, 2, 3, each of which correspond to a respective physical block of data 1, 2, 3, 4. Moreover, the physical blocks of data 1, 2, 3, 4 are each respectively mapped to physical block addresses 100, 101, 102, 103 in memory.

Again, snapshots of a given volume may be taken by performing a FlashCopy operation, thereby creating a copy of the given volume. Here, Volume B represents a snapshot taken of Volume A at a given point in time. Moreover, after the Volume B snapshot was created, a first host write operation was performed on logical block address 2 in Volume A, thereby changing the data 5 in the physical block corresponding to physical block address 102. However, the data 3 in the physical block corresponding to logical block address 2 of Volume B still matches the data originally included in the physical block corresponding to logical block address 2 of Volume A before the first host write operation was performed. Moreover, the physical block data 3 of Volume B is mapped to a distinct physical block address 201.

Similarly, Volume C represents a snapshot taken of Volume A taken at point in time after Volume B was formed. Moreover, after the Volume C snapshot was created, a second host write operation was performed on logical block address 1 in Volume A, thereby changing the data 6 in the physical block corresponding to physical block address 101. However, the data 2 in the physical block corresponding to logical block address 1 of Volume C still matches the data originally included in the physical block corresponding to logical block address 1 of Volume A before the second host write operation was performed. The physical block data 2 of Volume C is also mapped to a distinct physical block address 302. Moreover, it should again be noted that although only the third logical block 3 is shown in Volume B and only the second logical block 2 is shown in Volume C, a "Full FlashCopy" or "Incremental FlashCopy" may have been implemented. Accordingly the other logical blocks of Volume B and Volume C are dotted to represent that either of the volumes may include additional logical blocks from Volume A at a time the FlashCopy operation was performed, e.g., depending on the type of FlashCopy operation which was implemented.

As shown, logical block address 1 has been heavily accessed via Volume C and almost not at all via either of the other two volumes (Volume A and Volume B) in the dependency chain according to the present example. Thus, logical block address 1 of Volume C is desirably designated as having a high temperature, e.g., at least in comparison to the temperature associated with logical block address 1 of Volume B and/or of Volume A. This is highlighted in the heat tables 902, 904 which correspond to Volume B and Volume C respectively. Specifically, heat tables 902, 904 illustrate that the logical block address 1 of Volume C has a heat count that is six times higher than the heat count of logical block address 1 of Volume B in the present example. It follows that logical block address 1 of Volume C would be migrated to a high level storage tier, if not already located on one, e.g., such as SSD.

Figure 9B:
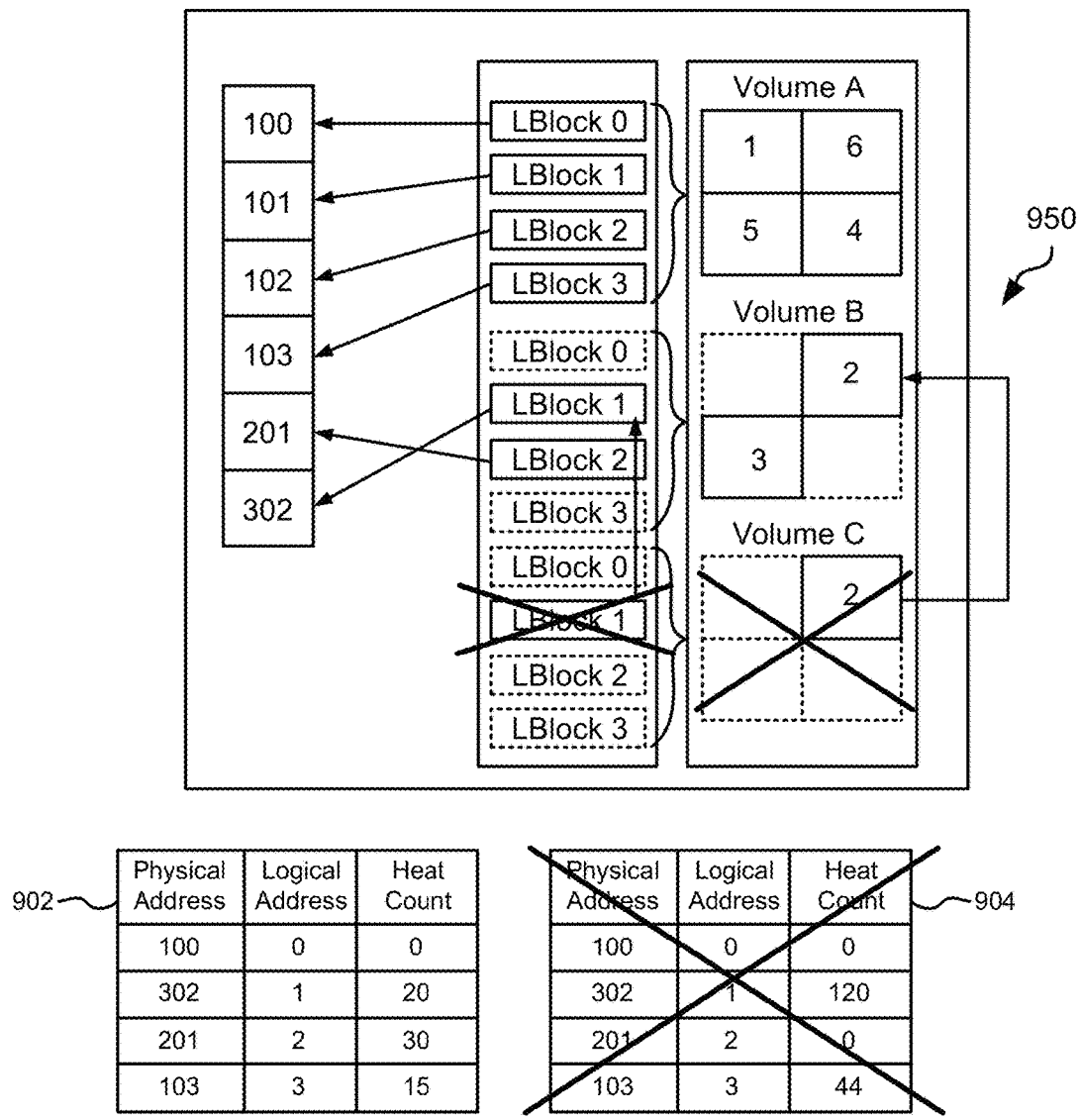
FIG. 9B is a representational view of the conventional process of migrating a logical block between volumes.

Looking now to FIG. 9B, the conventional process 950 of migrating a logical block between volumes is shown for the purpose of illustrating the existing shortcomings of conventional products, and is in no way intended to limit the invention. In order to delete Volume C, e.g., in response to receiving a deletion request, any data included in Volume C which Volume B depends on must first be migrated onto Volume B. As mentioned above, here Volume B depends on the data corresponding to logical block address 1 of Volume C in view of the second host write operation performed after Volume C was created. Thus, the data corresponding to logical block address 1 of Volume C is shown as being copied to Volume B. After the data has been migrated, Volume C and the corresponding heat table 904 are deleted. Accordingly, any data migrated to Volume B assumes the respective logical block address heat count which exists in the heat table 902, but also maintains the physical address which the logical block address is mapped to. Thus, in the present example, although logical block address 1 of Volume B has a low heat count as evidenced by heat table 902, it is undesirably mapped to a physical address on a high performance storage tier as a result of the data migration from Volume C.

It follows that data migration implemented in conventional products causes an inefficient use of data storage, thereby decreasing performance and increasing latency for the products as a whole.

In sharp contrast to the foregoing shortcomings of conventional products, various embodiments described herein are desirably able to improve the distribution of data across multi-tier data storage environments such that performance efficiency of the system as a whole improves. These improvements may be achieved by providing efficient data management of the different performance tiers in multi-tier storage architectures. According to some approaches, maintaining heat counts on a per volume basis may allow for a system to remain aware of data block movement activity during FlashCopy cleaning processes, e.g., as will be described in further detail below.

Figure 10:
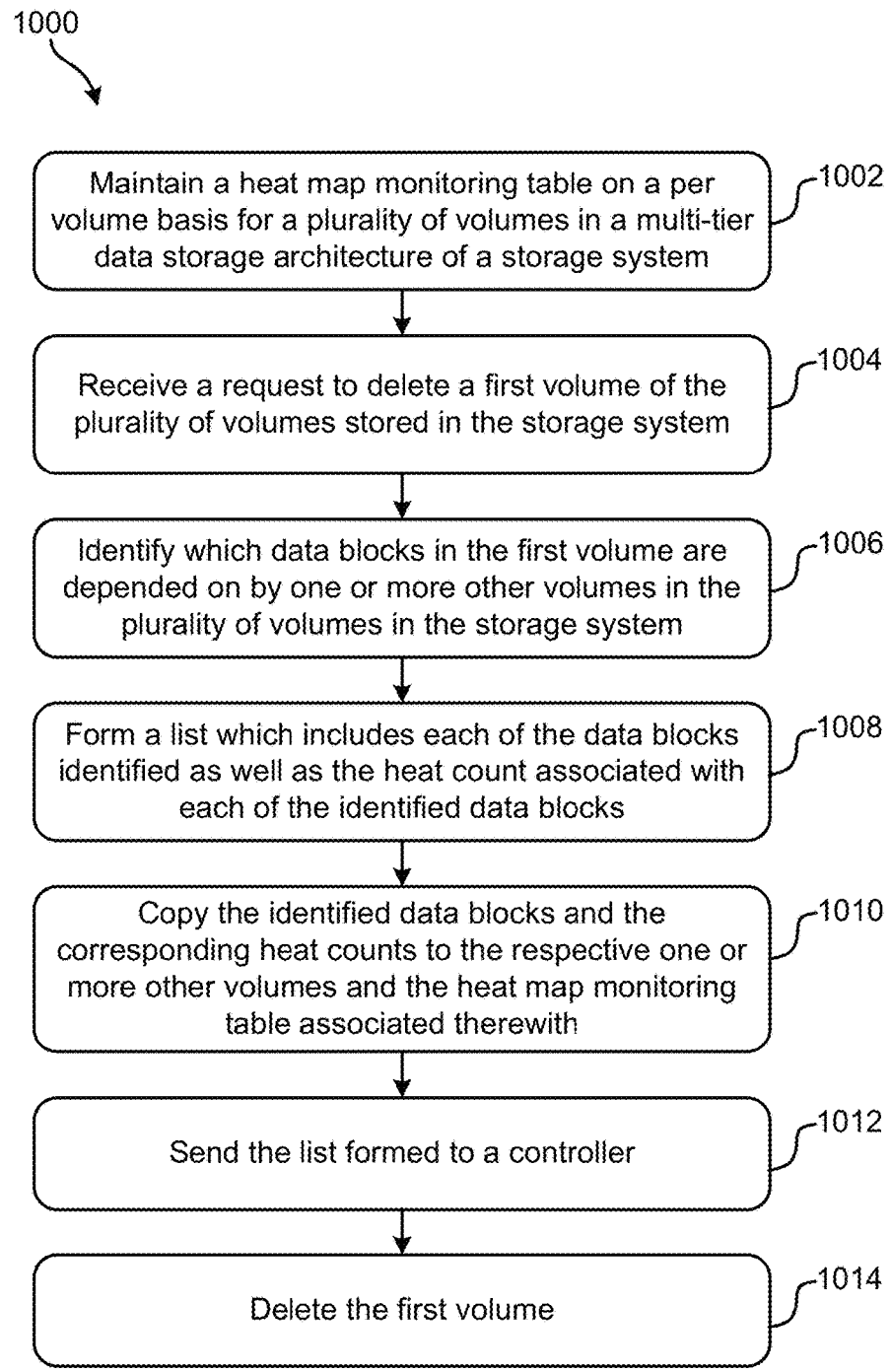
FIG. 10 is a flowchart of a computer-implemented method, in accordance with one embodiment.

Now referring to FIG. 10, a flowchart of a computer-implemented method 1000 is shown according to one embodiment. The method 1000 may be performed in accordance with the present invention in any of the environments depicted in FIGS. 1-9A, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, one or more of the operations included in method 1000 may be performed by a processor which is also configured to perform a FlashCopy operation, e.g., as described above. Moreover, any one or more of the operations included in method 1000 may be performed in response to invoking a FlashCopy operation to clean a virtual disk as would be appreciated by one skilled in the art after reading the present description.

In various other embodiments, the method 1000 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, operation 1002 of method 1000 includes maintaining a heat map monitoring table on a per volume basis for a plurality of volumes in a multi-tier data storage architecture of a storage system. It should be noted that "volumes" as used herein refer to logical volumes which are able to store multiple logical data blocks therein, e.g., as would be appreciated by one skilled in the art after reading the present description. Thus, the heat map monitoring table preferably includes (stores) a heat count value for each data block which is stored in the respective volume.

According to an illustrative approach, maintaining the heat map monitoring table on a per volume basis may be performed by incrementing a heat count corresponding to a data block in a given volume in response to the data block being accessed from the given volume. In other words, the heat count corresponding to a data block may be volume specific. It follows that if a given data block is accessed from a first volume, a heat count in the heat map monitoring table associated with the data block in a first volume is incremented while the heat count in the heat map monitoring table associated with the data block in a second volume is not incremented. As a result, the volume specific heat map monitoring tables are able to keep track of the frequency at which different data blocks are being accessed as well as which specific volume(s) the data blocks are being accessed from. According to various approaches, the heat count values in a heat map monitoring table may be incremented by any desired amount, e.g., implementing any desired increment size.

The heat map monitoring table may also include the physical address which each logical data block is mapped to in physical memory (e.g., see heat tables 902, 904 of FIG. 9A). Moreover, in preferred approaches, the heat map monitoring tables are maintained at a controller level of the system. Accordingly, the heat map monitoring tables may be stored in memory associated with (e.g., accessible by) a storage system controller.

With continued reference to FIG. 10, operation 1004 further includes receiving a request to delete a first volume of the plurality of volumes stored in the storage system. However, as previously mentioned, the process of deleting a specific logical volume begins with determining whether any data blocks included in that logical volume are referenced (depended on) by any other logical volumes in the storage system. For instance, returning to the snapshot example, an update to a first volume may be made after a full flash copy snapshot has been made of the first volume, thereby distinguishing the first volume from the second "snapshot" volume. The data originally included in the first volume and now memorialized in the second snapshot volume may be accessed by different users, host applications, pointers, etc. despite the update performed on the first volume. Therefore, any data included in the second snapshot volume which is still being accessed should be migrated to another volume before the second snapshot volume can be deleted without causing the storage system to become corrupted.

Accordingly, operation 1006 includes identifying (e.g., determining) which data blocks in the first volume are depended on by one or more other volumes in the plurality of volumes in the storage system. Moreover, operation 1008 includes forming a list which includes each of the data blocks identified in operation 1006 as well as the heat count associated with each of the identified data blocks. According to an illustrative approach, a FlashCopy cleaning process may be implemented to form a list of data blocks to be moved, along with each of the data blocks' corresponding heat count value. Thus, operation 1008 may include forming a list (e.g., an FC_Cleaning list) which includes a 2-tuple element for each data block identified to be copied to a different volume, the 2-tuple element including the physical block information and the heat count value corresponding to the respective identified data block.

According to an in-use example, this list of 2-tuple elements may be formed during a FlashCopy cleaning process performed on the volumes. In some approaches, a FlashCopy tool may be invoked by the system automatically in response to receiving a deletion request, e.g., as seen in operation 1004 above. Upon being invoked, the FlashCopy tool may first create an FC_Cleaning list having a 2-tuple element format for each identified data block. Subsequently, a list of dependent data blocks to be copied to their respective target volumes may be located, after which each entry in the list of dependent data blocks may be entered into the FC_Cleaning list, e.g., as will soon become apparent.

Method 1000 further includes copying the identified data blocks and the corresponding heat counts to the respective one or more other volumes (e.g., target volumes) and the heat map monitoring table associated therewith. See operation 1010. Updating the heat map monitoring tables with the heat count information corresponding to the data blocks being copied allows for a more accurate representation of the access information associated with the data blocks. As a result, physical memory in the storage system may be more efficiently used, e.g., as will soon become more apparent.

Although each of the data blocks may have been copied to their respective target volume, the location that each data block is stored in physical memory may still be determined as each data block of a given volume may be stored at a different location (e.g., storage tier) of a multi-tiered storage system. In preferred approaches, the heat counts associated with each of the data blocks copied to their respective target volumes are used to determine which tier of storage a given data block should be stored on. Again, the different tiers in a multi-tier data storage architecture may correspond to different levels of performance, each tier preferably storing data in such a way that efficiently utilizes the different levels of performance. For instance, heavily accessed "hot" data blocks may be stored on a higher performance storage tier (e.g., such as SSD), while lightly accessed "cold" data blocks may be stored on a lower performance storage tier (e.g., such as HDD) of the multi-tier data storage architecture. Accordingly, operation 1012 includes sending the list formed in operation 1008 to a controller. In some approaches, the controller may include (e.g., operates) an I/O monitoring daemon and/or a data relocation process. Thus, once received by the controller, the list of identified data blocks and corresponding heat counts may be used to manage the physical location that each of the data blocks are stored in, e.g., see method 1100 below.

Referring still to method 1000, operation 1014 further includes deleting the first volume. Once the data blocks identified in the first volume as being depended on by one or more other volumes have been copied to the respective volumes which they depend from, and the heat count values of the data blocks have been used to update the respective heat map monitoring tables, the deletion request received in operation 1004 may be performed. As previously mentioned, once it has been established that no other volumes depend on any information stored in a given volume, the given volume may be deleted without causing any data corruption in the storage system. The volume may be deleted according to any volume management processes and/or procedures which would be apparent to one skilled in the art after reading the present description. It follows that in some approaches, it may optionally be determined whether all data blocks identified in the first volume as being depended on by one or more other volumes have been copied to the respective volumes before operation 1014 is actually performed, e.g., for added data security.

Figure 11A:
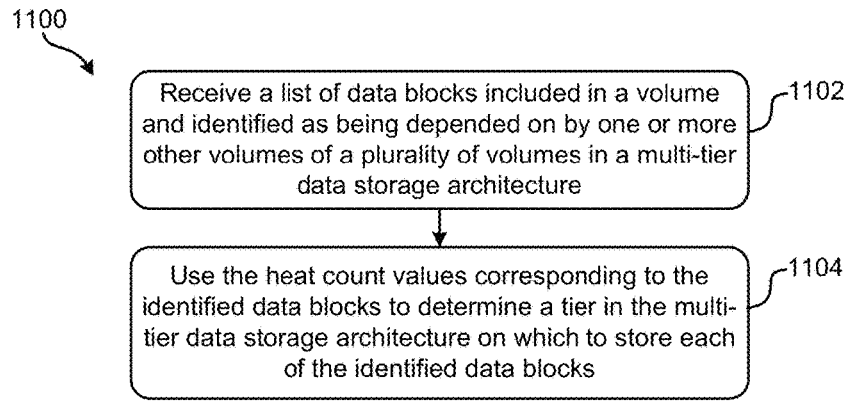
FIG. 11A is a flowchart of a computer-implemented method, in accordance with one embodiment.

Referring now to FIG. 11A, a flowchart of a computer-implemented method 1100 is shown according to one embodiment. The method 1100 may be performed in accordance with the present invention in any of the environments depicted in FIGS. 1-9A and 10, among others, in various embodiments. Of course, more or less operations than those specifically described in FIG. 11A may be included in method 1100, as would be understood by one of skill in the art upon reading the present descriptions.

Each of the steps of the method 1100 may be performed by any suitable component of the operating environment. For example, any one or more of the operations included in method 1100 may be performed by a controller which is also configured to operate an I/O monitoring daemon and/or a data relocation process. However, in various embodiments, the method 1100 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, a list of data blocks included in a volume to be deleted which are depended on by other volumes in a storage system, in addition to the heat counts corresponding to each of the data blocks, may be used to manage the physical location that each of the data blocks are stored in. Thus, operation 1102 of method 1100 includes receiving a list of data blocks included in a volume and identified as being depended on by one or more other volumes of a plurality of volumes in a multi-tier data storage architecture. The list received preferably also includes a heat count value corresponding to each of the identified data blocks on the list. Heat count values corresponding to data blocks are preferably maintained in a heat map monitoring table on a per volume basis for a plurality of volumes in the multi-tier data storage architecture, and may therefore be volume specific, e.g., as described above. It follows that a given heat map monitoring table preferably includes (stores) a heat count value for each data block which is stored in the volume corresponding thereto.

As described above, the data blocks included in the received list are each being relocated to a respective target volume. This relocation may be in response to the deletion of another volume which the data blocks originally corresponded to, e.g., see operation 1004 above. It follows that each of the data blocks and their corresponding heat count value are added to the respective target volume and corresponding heat table. The heat tables are preferably updated with the heat count value received such that the heat tables retain an accurate representation of the access count associated with each of the data blocks being introduced to the corresponding target volumes. In other words, the heat count values included in the received list are preferably used to update the heat count values in the heat tables corresponding to the target volumes. This results in desirable performance improvements by maintaining accurate accessibility counters despite movement of data blocks between volumes.

According to some approaches, the list of data blocks and corresponding heat count values may be received in the form of multiple 2-tuple elements. As previously mentioned, a 2-tuple element may include the physical block information as well as the heat count value corresponding to a given one of the identified data blocks, e.g., formed during a Flash-Copy cleaning process performed on the volumes. However, it should be noted that in some approaches, the list received in operation 1102 may only include the data blocks. Thus, the heat counts corresponding to the data blocks included in the list may be received separately, e.g., in response to sending a request, depending on the desired approach. It should be noted that "include the data blocks" is intended to indicate that the list includes a sufficient amount of information to find (e.g., locate) the data blocks. Thus, according to one approach, the list may include the physical block information corresponding to each of the data blocks included therein.

Once received, operation 1104 includes using the heat count values corresponding to the identified data blocks to determine a tier in the multi-tier data storage architecture on which to store each of the identified data blocks. Referring momentarily to FIG. 9A, a data block in a given volume corresponds to a logical block address, the logical block address in turn being mapped to a physical address in memory. Thus, the physical storage location at which a given data block is ultimately mapped to may be adjusted depending on different situations.

Figure 11B:
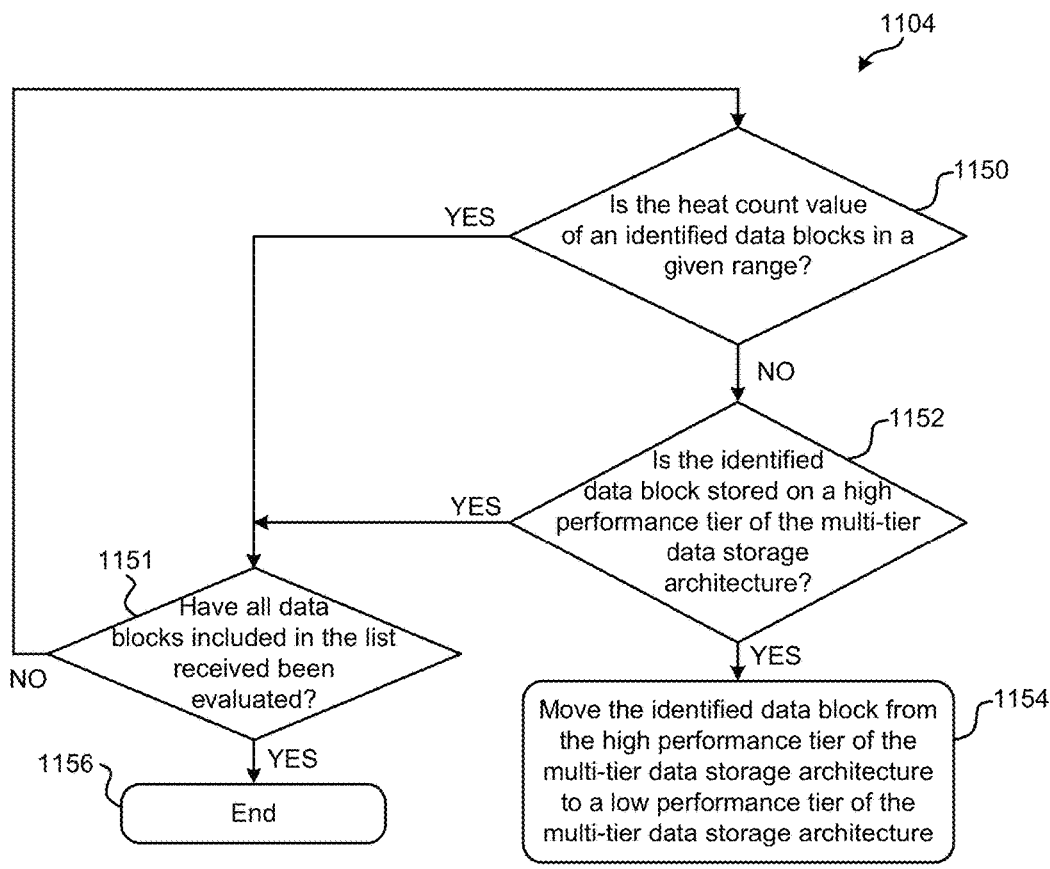
FIG. 11B is a flowchart of sub-operations for one of the operations in the flowchart of FIG. 11A, in accordance with one embodiment.

Looking now to FIG. 11B, exemplary sub-operations of using the heat count values corresponding to the identified data blocks to determine a tier in the multi-tier data storage architecture on which to store each of the identified data blocks are illustrated in accordance with one embodiment, one or more of which may be used to perform operation 1104 of FIG. 11A. However, it should be noted that the sub-operations of FIG. 11B are illustrated in accordance with one embodiment which is in no way intended to limit the invention.

As shown, decision 1150 includes determining whether the heat count value of each of the respective identified data blocks is in a given range. Again, the received list (e.g., an FC_Cleaning list) preferably includes a heat count value for each of the respective identified data blocks. Accordingly, the heat count values may be retrieved from the received list. Depending on the embodiment, the range may be predetermined by a user, calculated in real time based on performance of the different storage tiers, accessed from a lookup table, etc. It should also be noted that "in a given range" is in no way intended to limit the invention. Rather than determining whether a value (the heat count value) is in a given range, equivalent determinations may be made, e.g., as to whether a value is above a threshold, whether a value is outside a predetermined range, whether an absolute value is above a threshold, whether a value is below a threshold, etc., depending on the desired approach. According to an illustrative approach, decision 1150 may include an equivalent determination as to whether the heat count value of a given data block is greater than a threshold heat count value.

The flowchart illustrated in FIG. 11B proceeds to decision 1151 in response to determining that the heat count value corresponding to the identified data block is in the range (e.g., that the heat count value of the data block is greater than a threshold heat count value). There, decision 1151 determines whether all data blocks included in the list received have been evaluated. The flowchart returns to decision 1150 in response to determining that not all of the data blocks included in the received list have been evaluated, whereby decision 1150 may be repeated for a next data block included in the received list. Alternatively, the flowchart proceeds to operation 1156 in response to determining that all of the data blocks included in the received list have been evaluated, whereby the flowchart of FIG. 11B is ended.

It follows that a given identified data block is effectively maintained (e.g., is left) on the performance tier which the data block is currently located and is not relocated in response to determining that the identified data block is in the range. This is because a data block having a sufficiently high heat count value which is already stored on a higher performance tier may desirably remain there in view of the improved functionality the higher performance tier affords. Furthermore, if the data block having a sufficiently high heat count value is currently stored on a lower performance tier, it may be more desirable to refrain from moving the data block to a higher performance tier, e.g., until a management controller determines it is appropriate to do so after assessing a frequency at which the data block is accessed. However, it should be noted that in some approaches a data block stored on a lower performance tier while having a heat count value greater than a threshold heat count value may desirably be moved to a higher performance tier.

Referring back to decision 1150, the flowchart may alternatively proceed to decision 1152 in response to determining that the heat count corresponding to the identified data block is not in the range (e.g., that the heat count value of the data block is not greater than a threshold heat count value). Decision 1152 includes determining whether an identified data block is stored on a higher performance tier of the multi-tier data storage architecture.

In response to determining that the identified data block is not stored in the higher performance tier of the multi-tier data storage architecture, the flowchart proceeds to decision 1151. Again, decision 1151 determines whether all data blocks included in the list received have been evaluated. The flowchart returns to decision 1150 in response to determining that not all of the data blocks included in the received list have been evaluated, whereby decision 1150 may be repeated for a next data block included in the received list. Alternatively, the flowchart proceeds to operation 1156 in response to determining that all of the data blocks included in the received list have been evaluated, whereby the flowchart of FIG. 11B is ended.

Returning to decision 1152, in response to determining that the identified data block is stored in the higher performance tier of the multi-tier data storage architecture, sub-operation 1154 is performed. Again, it is desirable that a data block having a heat count value outside a range (e.g., less than a threshold heat count value) be stored on a lower performance tier in memory. Thus, if the data block is determined to be already stored on a lower performance tier (e.g., not stored on a high performance storage tier), it may be desirable to maintain the data block at its current location. However, if it is determined that a data block having a heat count value outside a range (e.g., less than a threshold heat count value) is stored on a higher performance tier in memory, it is desirable that the data block be moved to a lower storage tier.

Accordingly, as shown, sub-operation 1154 includes moving the identified data block from the higher performance tier of the multi-tier data storage architecture to a lower performance tier of the multi-tier data storage architecture. According to an exemplary approach, existing heat count mechanisms in multi-tier monitoring modules may be implemented (e.g., influenced) to consider the per volume information and accordingly perform data block movement (e.g., transfer) operations based on the new heat information statistics. As mentioned above, although it may be desirable to maintain and/or migrate hot data to a higher performance tier such as SSDs in view of the high throughput, low response times, higher IOPS, etc. associated with the higher performance tier, it is undesirable to use higher performance tier storage capacity to store cold data. Cold data is accessed less frequently than hot data and therefore typically does not benefit from the increased performance characteristics associated with higher performance tiers. As a result, the amount of higher performing (and usually more expensive) tier capacity used to meet the data storage needs of a given system is more efficiently allocated by implementing the various approaches described herein, thereby desirably increasing the efficiency by which data is processed in a storage system.

Again, decision 1151 determines whether all data blocks included in the list received have been evaluated. The flowchart returns to decision 1150 in response to determining that not all of the data blocks included in the received list have been evaluated, whereby decision 1150 may be repeated for a next data block included in the list. Alternatively, the flowchart of FIG. 11B is ended upon proceeding to sub-operation 1156 in response to determining that all of the data blocks included in the received list have been evaluated.

In view of the foregoing operations and sub-operations of FIGS. 11A-11B, it follows that by maintaining a heat map monitoring table on a per volume basis for a plurality of volumes in a multi-tier data storage architecture, data storage management efficiency may be significantly improved, e.g., particularly in view of the shortcomings experienced in conventional products.

According to an in-use example, which is in no way intended to limit the invention, using a heat count value corresponding to an identified data block to determine a tier in the multi-tier data storage architecture on which to store the identified data block may be performed using an I/O monitoring daemon (e.g., see 804 of FIG. 8). As alluded to above, an I/O monitoring daemon may monitor I/Os performed on data stored in memory and may thereby determine a temperature associated with each data block, e.g., based on an access frequency thereof. Moreover, a data relocator program may be used to relocate data between the different storage tiers as the current temperature corresponding to the data is updated. For example, data which has recently transitioned from having a "cold" temperature to a "hot" temperature may be relocated from a lower performance storage tier, to a higher performance storage tier. It should be noted that "higher performance" and "lower performance" as used herein is intended to refer to the relative average data access time for fulfilling a read and/or write request, which can be readily determined via product literature, observing the performance of the respective tiers, etc. For example, lower performance storage tiers may include magnetic tape storage, optical media, relatively slower accessing HDDs, etc., while higher performance storage tiers may include nonvolatile memory (NVM), NVRAM, solid state memory in SSDs, flash memory, SSD arrays, flash memory arrays, etc. Again, the efficiency of high performance storage tier consumption at a given point in time is improved dramatically over conventional products as a result.

According to another in-use example, implementations for various ones of the approaches described herein may include mechanisms for which, during a cleaning process, a FlashCopy operation will keep track of dependent data blocks being copied from one location to other locations and form a list "FC_Cleaning list" which includes a 2-tuple element <PhysicalBlock, TargetVolumeHeatCount> for each of the identified dependent data blocks. Moreover, a multi-tier monitoring daemon may receive the "FC_Cleaning list", and for each entry in the "FC_Cleaning list", the monitoring daemon preferably checks whether a heat count value of each of the data blocks included in the "FC_Cleaning list" exceeds threshold heat count value (e.g., is inside a given heat count value range). If the heat count value of a given data block does exceed the threshold heat count value (e.g., is in the range), it remains on the performance tier which it is currently stored on. Moreover, the heat map monitoring table associated with the given data block is preferably updated with the heat count value of the data block as described herein. However, if the heat count value of a given data block does not exceed the threshold heat count value and the data block is located on a higher performance tier, the data block is preferably demoted to a lower performance tier during the copy operation.

It follows that various embodiments described herein are able to provide efficient data management of higher performance tiers in multi-tiered storage architectures by ensuring data block movement activity is monitored and evaluated during FlashCopy cleaning processes. As described above, this may be achieved by maintaining a heat map monitoring tables on a per volume basis for a plurality of volumes in multi-tier data storage architectures and using the heat map monitoring tables to determine a desired storage location for various data blocks. Thus, by maintaining a heat map monitoring tables on a per volume basis, if a data block is being moved from a volume that had contributed a majority of the heat count value for that data block, during the deletion process of that volume, the data block is preferably moved down to a lower performance tier and stored at the next available volume. This is done because the major contributor of the heat count value for this data block is now being deleted. Hence it is best placed on a lower performing tier.

Moreover, it should be noted that although a number of the embodiments described above are in reference to a two-tiered storage architecture having a higher performance tier and a lower performance tier, any of the approaches described herein may be implemented with multi-tiered storage architectures having more tiers. For instance, any one of the embodiments included in FIGS. 10-11B may be adjusted to be implemented with a multi-tiered storage architecture which includes a higher performance tier, a medium performance tier and a lower performance tier, e.g., as would be apparent to one skilled in the art after reading the present description.

As described above, one or more of the operations included in method 1000 may be performed by a processor which is also able to perform a FlashCopy operation, while one or more of the operations included in method 1100 may be performed by a controller which is also able to operate an I/O monitoring daemon and/or perform a data relocation process for a multi-tier appliance. Accordingly, in order to facilitate communication between a FlashCopy based processor and a mulit-tier appliance based processor, different practices may be implemented, e.g., depending on the desired embodiment. According to some embodiments, a separate out-of-band protocol may be implemented to facilitate communication between the two types of processors. In other embodiments, reserved fields in a write command descriptor block (CDB), e.g., such as a Small Computer System Interface (SCSI) CDB may be used to facilitate the aforementioned communication. Still in other embodiments, both the FlashCopy and multi-tier appliance capabilities may be implemented as layers within a same storage controller (e.g., processor), whereby information may be passed between the different layers thereby enabling communication therebetween. According to an example, which is in no way intended to limit the invention, a high-performance and preferably high-capacity series of disk storage may implement a mechanism to communicate heat map information from one storage system to another. As a result, when a failure occurs in remote copy scenarios, the applicable data is in the appropriate tier of storage. Moreover, similar implementations may be used when reserved fields of write CDB are used.

A SCSI CDB includes a block of information that describes a given command. Each CDB typically includes a total of 6, 10, 12, or 16 bytes, but some approaches may include variable-length CDBs which include any desired number of bytes. Moreover, the CDB may include a one byte operation code followed by some command-specific parameters. The parameters may not be a full byte long, and the parameter length varies from one command to another, e.g., as would be appreciated by one skilled in the art after reading the present description.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figure 12:
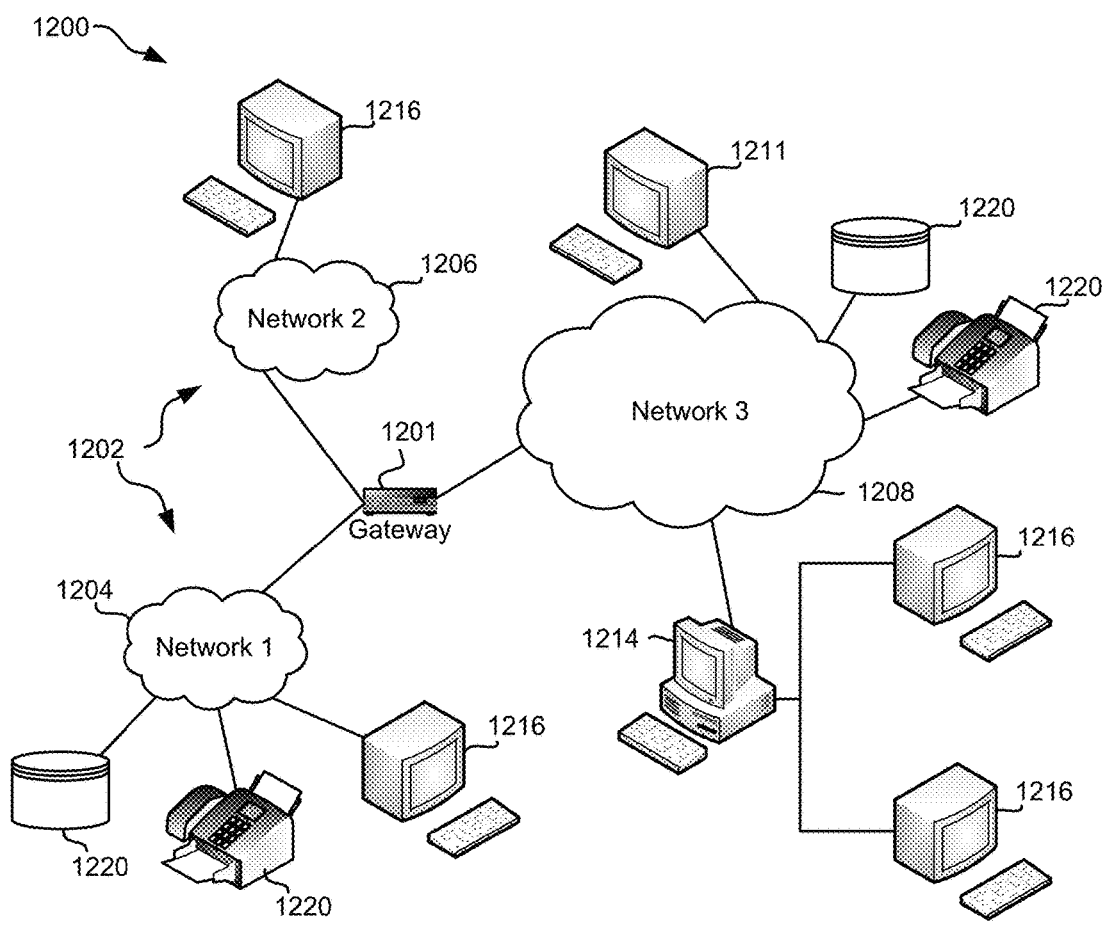
FIG. 12 is a network architecture, in accordance with one embodiment.

FIG. 12 illustrates a network architecture 1200, in accordance with one embodiment. As shown in FIG. 12, a plurality of remote networks 1202 are provided including a first remote network 1204 and a second remote network 1206. A gateway 1201 may be coupled between the remote networks 1202 and a proximate network 1208. In the context of the present network architecture 1200, the networks 1204, 1206 may each take any form including, but not limited to a LAN, a WAN such as the Internet, public switched telephone network (PSTN), internal telephone network, etc.

In use, the gateway 1201 serves as an entrance point from the remote networks 1202 to the proximate network 1208. As such, the gateway 1201 may function as a router, which is capable of directing a given packet of data that arrives at the gateway 1201, and a switch, which furnishes the actual path in and out of the gateway 1201 for a given packet.

Further included is at least one data server 1214 coupled to the proximate network 1208, and which is accessible from the remote networks 1202 via the gateway 1201. It should be noted that the data server(s) 1214 may include any type of computing device/groupware. Coupled to each data server 1214 is a plurality of user devices 1216. Such user devices 1216 may include a desktop computer, laptop computer, handheld computer, printer, and/or any other type of logic-containing device. It should be noted that a user device 1211 may also be directly coupled to any of the networks, in some embodiments.

A peripheral 1220 or series of peripherals 1220, e.g., facsimile machines, printers, scanners, hard disk drives, networked and/or local data storage units or systems, etc., may be coupled to one or more of the networks 1204, 1206, 1208. It should be noted that databases and/or additional components may be utilized with, or integrated into, any type of network element coupled to the networks 1204, 1206, 1208. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 1204, 1206, 1208, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 13:
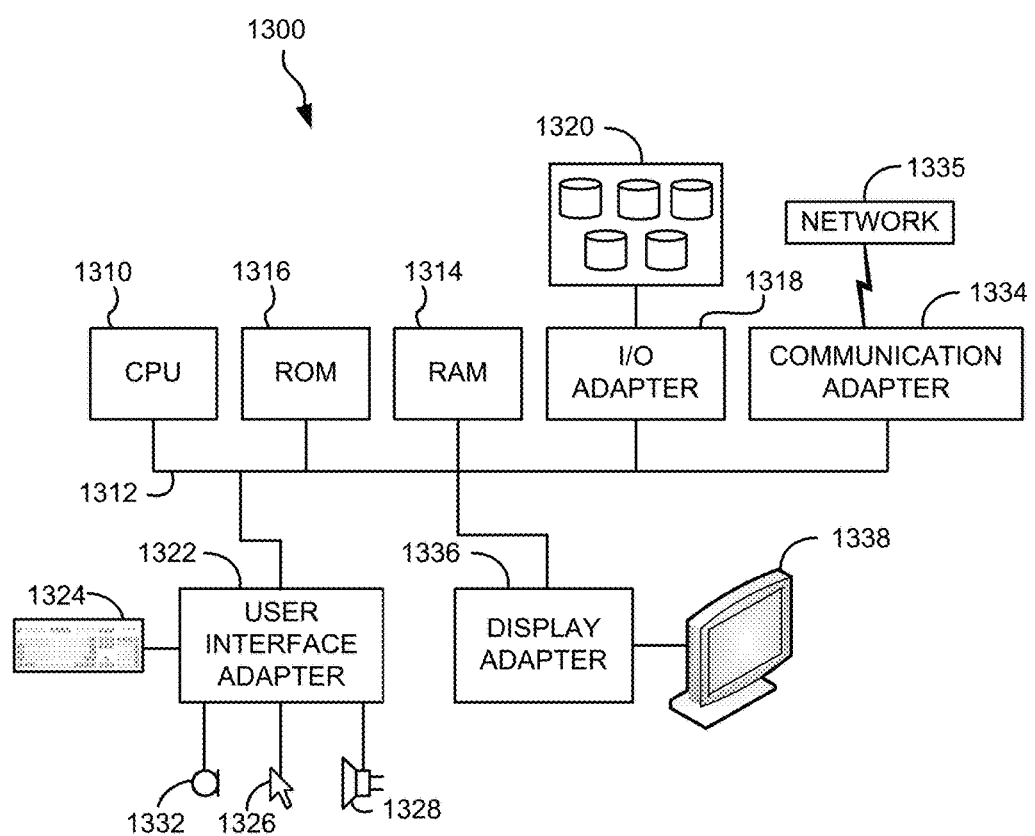
FIG. 13 is a representative hardware environment that may be associated with the servers and/or clients of FIG. 12, in accordance with one embodiment.

FIG. 13 shows a representative hardware environment associated with a user device 1216 and/or server 1214 of FIG. 12, in accordance with one embodiment. FIG. 13 illustrates a typical hardware configuration of a processor system 1300 having a central processing unit 1310, such as a microprocessor, and a number of other units interconnected via a system bus 1312, according to one embodiment. In some embodiments, central processing unit 1310 may include any of the approaches described above with reference to the one or more processors 210 of FIG. 2.

The processor system 1300 shown in FIG. 13 includes a RAM 1314, ROM 1316, and an I/O adapter 1318. According to some embodiments, which are in no way intended to limit the invention, I/O adapter 1318 may include any of the approaches described above with reference to I/O adapter 218 of FIG. 2. Referring still to processor system 1300 of FIG. 13, the aforementioned components 1314, 1316, 1318 may be used for connecting peripheral devices such as storage subsystem 1320 to the bus 1312. In some embodiments, storage subsystem 1320 may include a similar and/or the same configuration as data storage system 220 of FIG. 2. According to an example, which is in no way intended to limit the invention, storage subsystem 1320 may include non-volatile data storage cards, e.g., having NVRAM memory cards, RAM, ROM, and/or some other known type of non-volatile memory, in addition to RAID controllers as illustrated in FIG. 2.

With continued reference to FIG. 13, a user interface adapter 1322 for connecting a keyboard 1324, a mouse 1326, a speaker 1328, a microphone 1332, and/or other user interface devices such as a touch screen, a digital camera (not shown), etc., to the bus 1312.

Processor system 1300 further includes a communication adapter 1334 which connects the processor system 1300 to a communication network 1335 (e.g., a data processing network) and a display adapter 1336 which connects the bus 1312 to a display device 1338.

The processor system 1300 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 14:
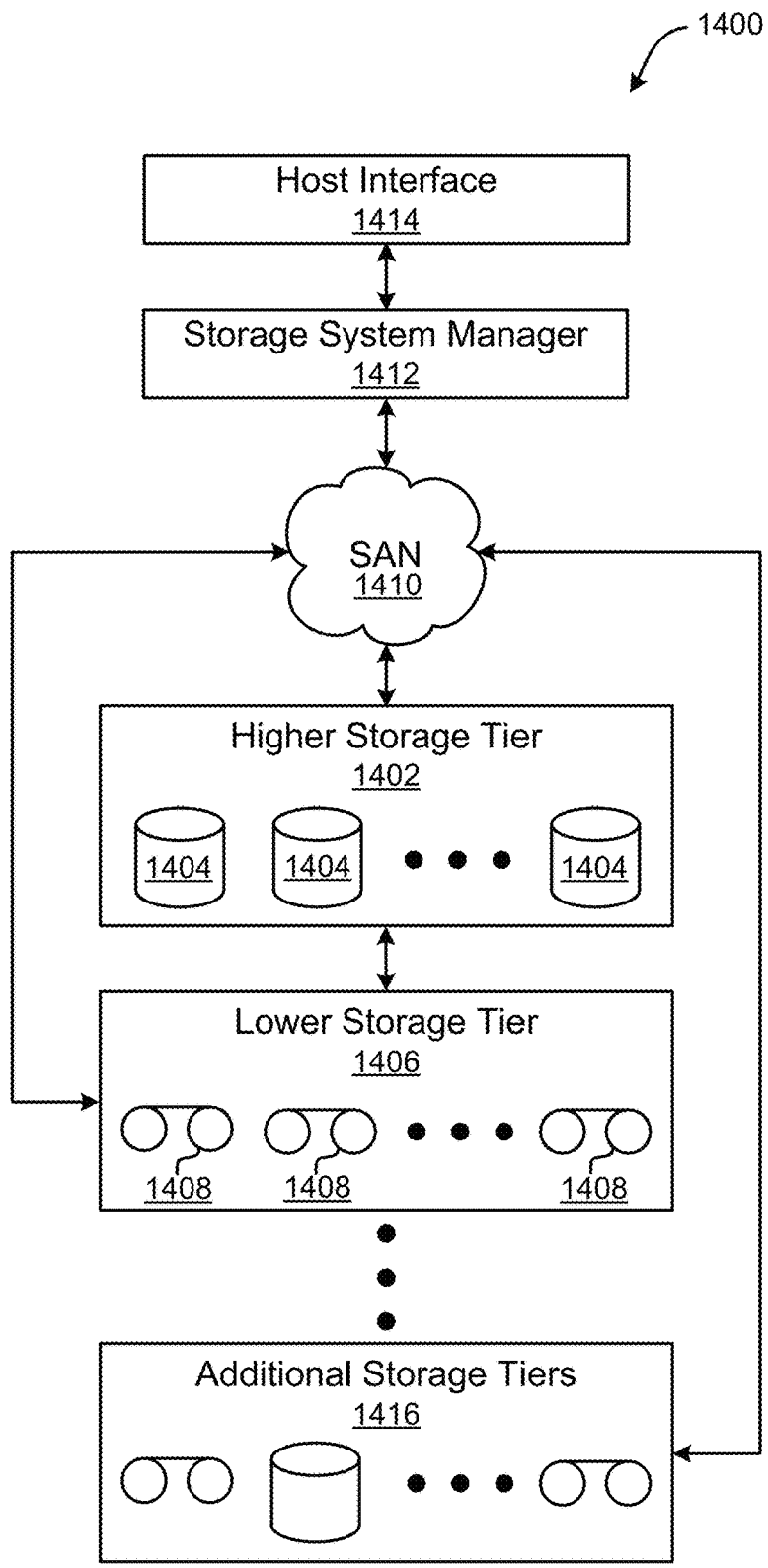
FIG. 14 is a tiered data storage system in accordance with one embodiment.

Moreover, FIG. 14 illustrates a storage system 1400 which implements high level (e.g., SSD) storage tiers in combination with lower level (e.g., magnetic tape) storage tiers, according to one embodiment. Note that some of the elements shown in FIG. 14 may be implemented as hardware and/or software, according to various embodiments. The storage system 1400 may include a storage system manager 1412 for communicating with a plurality of media on at least one higher storage tier 1402 and at least one lower storage tier 1406. However, in other approaches, a storage system manager 1412 may communicate with a plurality of media on at least one higher storage tier 1402, but no lower storage tier. The higher storage tier(s) 1402 preferably may include one or more random access and/or direct access media 1404, such as hard disks, NVM, NVRAM, solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 1402 depending on the desired embodiment.

Referring still to FIG. 14, the lower storage tier(s) 1406 preferably includes one or more lower performing storage media 1408, including sequential access media such as magnetic tape in tape drives and/or optical media, slower accessing HDDs, slower accessing SSDs, etc., and/or others noted herein or known in the art. One or more additional storage tiers 1416 may include any combination of storage memory media as desired by a designer of the system 1400. Thus the one or more additional storage tiers 1416 may, in some approaches, include a SSD system architecture similar or the same as those illustrated in FIGS. 1-2. Also, any of the higher storage tiers 1402 and/or the lower storage tiers 1406 may include any combination of storage devices and/or storage media.

The storage system manager 1412 may communicate with the storage media 1404, 1408 on the higher storage tier(s) 1402 and lower storage tier(s) 1406 through a network 1410, such as a storage area network (SAN), as shown in FIG. 14, or some other suitable network type. The storage system manager 1412 may also communicate with one or more host systems (not shown) through a host interface 1414, which may or may not be a part of the storage system manager 1412. The storage system manager 1412 and/or any other component of the storage system 1400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1402, may include a majority of SSD storage media for storing data in a higher performing storage environment, and remaining storage tiers, including lower storage tier 1406 and additional storage tiers 1416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1402, while data not having one of these attributes may be stored to the additional storage tiers 1416, including lower storage tier 1406. Of course, one of skill in the art, upon reading the present descriptions, may devise many other combinations of storage media types to implement into different storage schemes, according to the embodiments presented herein.

According to some embodiments, the storage system (such as 1400) may include logic configured to receive a request to open a data set, logic configured to determine if the requested data set is stored to a lower storage tier 1406 of a tiered data storage system 1400 in multiple associated portions, logic configured to move each associated portion of the requested data set to a higher storage tier 1402 of the tiered data storage system 1400, and logic configured to assemble the requested data set on the higher storage tier 1402 of the tiered data storage system 1400 from the associated portions.

Of course, this logic may be implemented as a method on any device and/or system or as a computer program product, according to various embodiments.

What is claimed is:

1. A computer-implemented method, comprising:
    maintaining a heat map monitoring table on a per volume basis for a plurality of volumes in a multi-tier data storage architecture, wherein the heat map monitoring table includes a heat count for each data block in the respective volume;
    receiving a request to delete a first volume of the plurality of volumes;
    identifying which data blocks in the first volume are depended on by one or more other volumes of the plurality of volumes;
    copying the identified data blocks and the corresponding heat counts to the respective one or more other volumes; and
    sending a list which includes the identified data blocks and the corresponding heat counts to a controller.

2. The computer-implemented method of claim 1, wherein the controller includes an I/O monitoring daemon.

3. The computer-implemented method of claim 1, wherein maintaining the heat map monitoring table on a per volume basis includes:
    incrementing a heat count corresponding to a data block in a given volume in response to the data block being accessed from the given volume.

4. The computer-implemented method of claim 1, wherein the multi-tier data storage architecture includes a higher performance tier and a relatively lower performance tier.

5. The computer-implemented method of claim 4, wherein the higher performance tier of the multi-tier data storage architecture includes a solid state drive.

6. The computer-implemented method of claim 4, wherein the lower performance tier of the multi-tier data storage architecture includes a hard disk drive.

7. A computer-implemented method, comprising:
    receiving a list of data blocks included in a volume and identified as being depended on by one or more other volumes of a plurality of volumes in a multi-tier data storage architecture,
    wherein the list includes a heat count corresponding to each of the identified data blocks in the list,
    wherein the heat counts correspond to a heat map monitoring table maintained on a per volume basis for a plurality of volumes in the multi-tier data storage architecture; and
    using heat counts corresponding to the identified data blocks to determine a tier in the multi-tier data storage architecture on which to store each of the identified data blocks.

8. The computer-implemented method of claim 7, wherein using the heat counts corresponding to the identified data blocks to determine a tier in the multi-tier data storage architecture on which to store each of the identified data blocks is performed using an I/O monitoring daemon.

9. The computer-implemented method of claim 7, wherein using the heat counts corresponding to the identified data blocks to determine a tier in the multi-tier data storage architecture on which to store each of the identified data blocks includes:
    determining whether the heat count of each of the respective identified data blocks is in a range;
    determining whether an identified data block is stored on a higher performance tier of the multi-tier data storage architecture in response to determining that the heat count corresponding to the identified data block is not in the range; and
    moving the identified data block from the higher performance tier of the multi-tier data storage architecture to a relatively lower performance tier of the multi-tier data storage architecture in response to determining that the identified data block is stored on the higher performance tier.

10. The computer-implemented method of claim 9, comprising:
    leaving the identified data block on a current performance tier of the multi-tier data storage architecture in response to determining that the heat count corresponding to the identified data block is in the range.

11. The computer-implemented method of claim 9, wherein the higher performance tier of the multi-tier data storage architecture includes a solid state drive.

12. The computer-implemented method of claim 9, wherein the lower performance tier of the multi-tier data storage architecture includes a hard disk drive.

13. The computer-implemented method of claim 7, wherein the multi-tier data storage architecture includes a higher performance tier and a relatively lower performance tier, wherein the higher performance tier of the multi-tier data storage architecture includes a solid state drive, wherein the lower performance tier of the multi-tier data storage architecture includes a hard disk drive.

14. A computer program product comprising a computer readable storage medium having program instructions embodied therewith, wherein the computer readable storage medium is not a transitory signal per se, the program instructions readable and/or executable by a processor to cause the processor to perform a method comprising:
    receiving, by the processor, a list of data blocks included in a volume and identified as being depended on by one or more other volumes of a plurality of volumes in a multi-tier data storage architecture;
    wherein the list includes a heat count corresponding to each of the identified data blocks in the list,
    wherein the heat counts correspond to a heat map monitoring table maintained on a per volume basis for a plurality of volumes in the multi-tier data storage architecture; and
    using, by the processor, heat counts corresponding to the identified data blocks to determine a tier in the multi-tier data storage architecture on which to store each of the identified data blocks.

15. The computer program product of claim 14, wherein using the heat counts corresponding to the identified data blocks to determine a tier in the multi-tier data storage architecture on which to store each of the identified data blocks is performed using an I/O monitoring daemon.

16. The computer program product of claim 14, wherein using the heat counts corresponding to the identified data blocks to determine a tier in the multi-tier data storage architecture on which to store each of the identified data blocks includes:
    determining, by the processor, whether the heat count of each of the respective identified data blocks is in a range;
    determining, by the processor, whether an identified data block is stored on a higher performance tier of the multi-tier data storage architecture in response to determining that the heat count corresponding to the identified data block is not in the range; and
    moving, by the processor, the identified data block from the higher performance tier of the multi-tier data storage architecture to a lower performance tier of the multi-tier data storage architecture in response to determining that the identified data block is stored on the higher performance tier.

17. The computer program product of claim 16, comprising:
leaving the identified data block on a current performance tier of the multi-tier data storage architecture in response to determining that the heat count corresponding to the identified data block is in the range.

18. The computer program product of claim 16, wherein the higher performance tier of the multi-tier data storage architecture includes a solid state drive.

19. The computer program product of claim 16, wherein the lower performance tier of the multi-tier data storage architecture includes a hard disk drive.

20. The computer program product of claim 14, wherein the multi-tier data storage architecture includes a higher performance tier and a lower performance tier, wherein the higher performance tier of the multi-tier data storage architecture includes a solid state drive, wherein the lower performance tier of the multi-tier data storage architecture includes a hard disk drive.

* * * * *